(12) United States Patent  
Tsuchiyama

(10) Patent No.: US 7,103,161 B2  
(45) Date of Patent: Sep. 5, 2006

(54) MOBILE TERMINAL DEVICE, METHOD OF CONTROLLING TELEPHONE NUMBER DISPLAY AND PROGRAM THEREOF

(75) Inventor: Kinya Tsuchiyama, Tokyo (JP)

(73) Assignee: Nec Corporation, Tokyo (JP)

( * ) Notice: Subject to any disclaimer, the term of this patent is extended or adjusted under 35 U.S.C. 154(b) by 349 days.

(21) Appl. No.: 10/322,535

(22) Filed: Dec. 19, 2002

(65) Prior Publication Data

US 2003/0125016 A1 Jul. 3, 2003

(30) Foreign Application Priority Data

Dec. 28, 2001 (JP) .............................. 2001-398720

(51) Int. Cl.
*H04M 11/00* (2006.01)

(52) U.S. Cl. .............................. 379/93.23; 455/414.1; 455/566; 709/227

(58) Field of Classification Search ................ 455/405, 455/412.1, 412.2, 418, 419, 566, 528, 508; 379/114.2, 142.01, 355.02, 93.23

See application file for complete search history.

(56) References Cited

U.S. PATENT DOCUMENTS

| | | | |
|---|---|---|---|
| 5,528,558 A | | 6/1996 | Mardhekar et al. |
| 5,754,960 A | * | 5/1998 | Downs et al. ............. 455/508 |
| 6,526,274 B1 | * | 2/2003 | Fickes et al. ............. 455/414.1 |
| 6,529,724 B1 | * | 3/2003 | Khazaka et al. ............. 455/405 |
| 6,704,398 B1 | * | 3/2004 | Tsuchiyama ............. 379/93.23 |
| 6,766,017 B1 | * | 7/2004 | Yang ...................... 379/355.02 |
| 2002/0037754 A1 | * | 3/2002 | Hama et al. ................. 455/566 |
| 2002/0064263 A1 | | 5/2002 | McBrearty et al. |
| 2002/0073207 A1 | * | 6/2002 | Wiger et al. ................. 709/227 |
| 2002/0151334 A1 | | 10/2002 | Sharma |

FOREIGN PATENT DOCUMENTS

| | | |
|---|---|---|
| GB | 2354134 | 3/2001 |
| JP | 01-061157 | 3/1989 |
| JP | 2-196552 | 8/1990 |
| JP | 2-224450 | 9/1990 |
| JP | 8-214053 | 8/1996 |
| JP | 11068918 | 3/1999 |
| JP | 11225200 | 8/1999 |
| JP | 2000-278392 | 10/2000 |
| JP | 2000278392 | 10/2000 |
| JP | 2001-136266 | 5/2001 |
| JP | 2001136266 | 5/2001 |

* cited by examiner

*Primary Examiner*—Fan Tsang  
*Assistant Examiner*—Md Shfiul Alam Elahee  
(74) *Attorney, Agent, or Firm*—Young & Thompson

(57) ABSTRACT

A mobile terminal device can store telephone numbers, and can allow a telephone number list to be displayed. In this mobile terminal device, when a user makes a telephone call, the frequency of calling is counted for every telephone number and is stored in a memory. The telephone numbers are rearranged in sequence of the frequency of calling. The user can set a time to count the frequency of calling and to update a display sequence of the telephone numbers.

6 Claims, 8 Drawing Sheets

WOULD YOU LIKE TO HAVE LEARNING FUNCTION TO BE SET UP ?

YES          NO

WOULD YOU LIKE TO HAVE TIME MODE TO BE SET UP ?

YES　　　　　　　　　　NO

FIG. 6B

COUNT EVERY [ ] HOURS AND UPDATE DISPLAY SEQUENCE

FIG. 8A

WOULD YOU LIKE TO HAVE TIME ZONE MODE TO BE SET UP ?

YES            NO

FIG. 8B

PLEASE INPUT TIME TO SET THE MODE TO "ON"
START 00:00
END   00:00

MOBILE TERMINAL DEVICE, METHOD OF CONTROLLING TELEPHONE NUMBER DISPLAY AND PROGRAM THEREOF

BACKGROUND OF THE INVENTION

1. Field of the Invention

The present invention relates to a mobile terminal device and a method of controlling a telephone number display and a program thereof and, more in particular, to the control of the display sequence of telephone numbers held in the mobile terminal device.

2. Description of the Related Prior Art

A mobile terminal device such as a cellular phone and the like can register telephone numbers sent and received in a memory portion (telephone directory) provided in its terminal. The user of the mobile terminal device can easily make a call by selecting a desired telephone number from among the telephone numbers displayed. Further, the device can easily memorize the telephone number of a caller when a call is received. When the user of the mobile terminal device allows a plurality of telephone numbers held in the mobile terminal device to be displayed, a display sequence thereof which can be used is in order of the alphabet, the memory numbers, the digit-dialing numbers or the frequency of use (the frequency of call-out/the frequency of call-in). Japanese Patent Laid-open No. 2000-278392 discloses a method in which the telephone numbers are displayed in sequence according to the frequency of use. Japanese Patent Laid-open No. 2001-136266 discloses a technology in which abbreviated dialing numbers or e-mail addresses registered in a memory are controlled by the date of registration.

However, the user of the mobile terminal device often makes phone calls to callees different according to a time zone. Hence, in the case where the display sequence of the telephone numbers is fixed, it is not access-friendly for the user, and thus it is inconvenient.

SUMMARY OF THE INVENTION

Accordingly, an object of the present invention is to provide a mobile terminal device capable of a display sequence of telephone numbers, which is convenient to the user of the mobile terminal device, and a method of controlling the display sequence of telephone numbers.

In the present invention, the mobile terminal device is a mobile terminal device which can hold and display the telephone numbers, and the mobile terminal device comprises count means for counting the frequency of calling for every telephone number, a first memory portion for storing the updated frequency of calling for every telephone number, display sequence determination means for determining the display sequence of the telephone numbers according to the frequency of calling to the telephone numbers, a second memory portion for storing the display sequence of the telephone numbers, and control means for controlling the count of the telephone numbers and the determination of the display sequence.

A method of controlling a telephone number display of the present invention comprises the following steps. These are the steps of: storing the telephone numbers in the mobile terminal device, counting and storing the frequency of calling to the telephone numbers, determining the display sequence of the telephone numbers according to the counted frequency of calling and storing the display sequence thereof and displaying the telephone numbers according to the display sequence.

Further, in the present invention, a program giving an instruction to a computer and controlling the telephone number display in the mobile terminal device comprises the steps of counting the frequency of calling to the telephone numbers stored in the mobile terminal device, storing the counted frequency of calling, and determining the display sequence of the telephone numbers according to the frequency of calling and storing the display sequence thereof.

BRIEF DESCRIPTION OF THE DRAWINGS

The above and other objects, features and advantages of the present invention will become apparent from the following detailed description when taken with the accompanying drawings in which:

FIG. 4 shows the embodiment of a display screen of the mobile terminal device;

FIGS. 6A, 6B show the embodiment of the display screen of the mobile terminal;

FIGS. 8A, 8B show the embodiment of the display screen of the mobile terminal device.

DETAILED DESCRIPTION OF THE PREFERRED EMBODIMENTS

A function characterizing an operation of a mobile terminal device of the present invention is mainly realized by a central processing unit (hereinafter, referred to as CPU).

Figure 1:
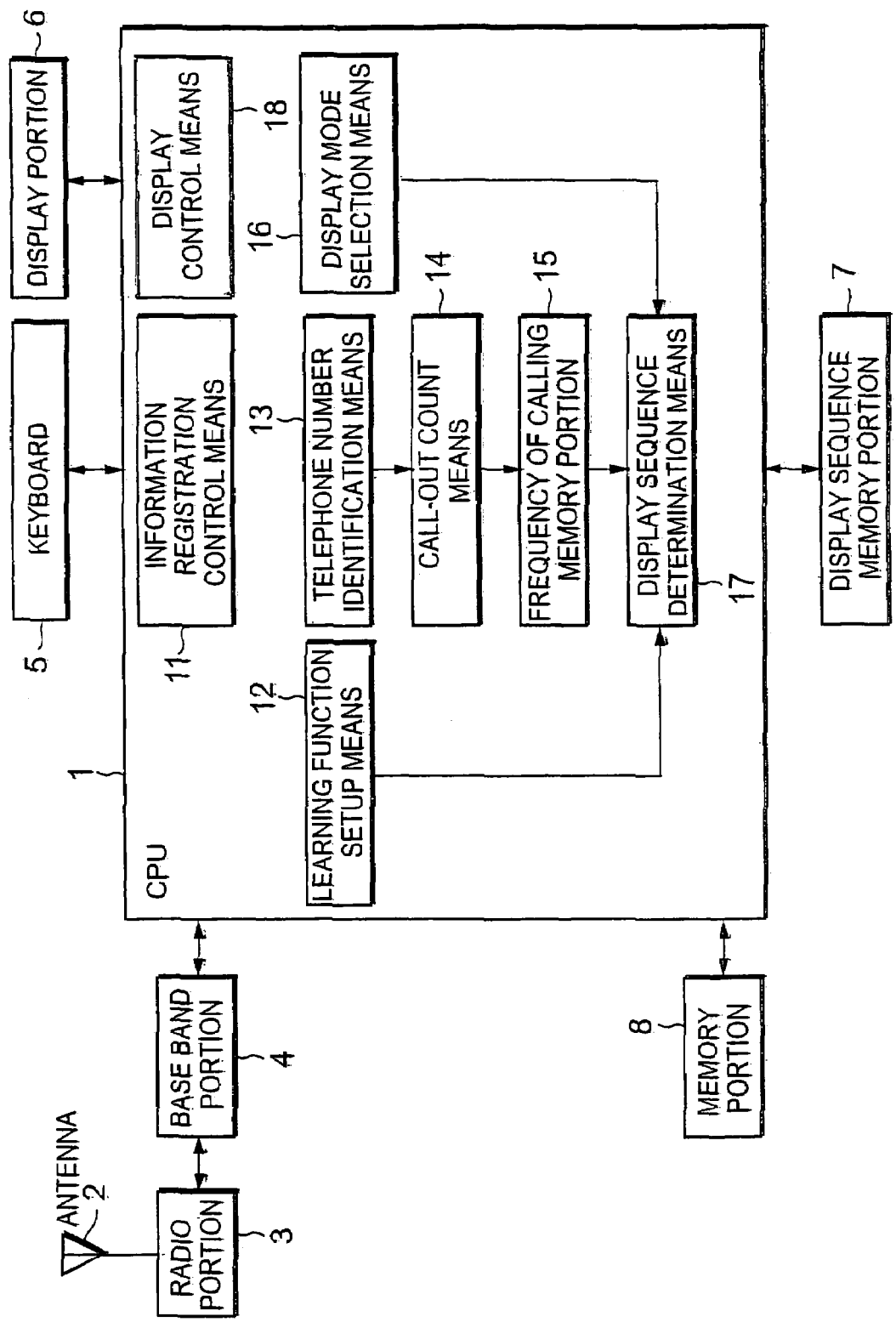
FIG. 1 is a block diagram showing an embodiment of a mobile terminal device.

Referring to FIG. 1, the mobile terminal device of an embodiment comprises a CPU 1 which operates by a program control, an antenna 2, a radio portion 3, a base-band portion 4 which codes and decodes data transmitted and received by the radio portion 4, a keyboard 5, a display portion 6, a display sequence memory portion 7 for storing a display sequence of telephone numbers, and a memory portion 8 for storing a program implemented in the CPU 1. Both of, or either one of the display sequence memory portion 7 and the memory portion 8 can be set in the CPU 1 or in a separate memory other than the CPU 1.

The CPU 1 is a computer, and comprises information register control means 11, learning function setup means 12, telephone number identification means 13, call-out count means 14, frequency of calling memory means 15, display mode selection means 16, display sequence determination means 17 and display control means 18. The information register control means 11 receives information inputted from the keyboard 5 and registers information such as telephone numbers, names and the like (described below as telephone numbers and the like) in a telephone number storing portion (not shown). Further, the information register control means 11 can register a callee's telephone number and the like received by the user. Based on the selection by the user, the learning function setup means 12 determines the display sequence of the telephone numbers and the like in the order of either the frequency of calling or the alphabet. The telephone number identification means 13, when making a call, identifies the telephone number of the calling. The call-out count means 14, when the telephone number identification means 13 identifies the telephone number of the calling, adds 1 to the frequency of calling of the telephone numbers stored in the frequency of calling memory means 15, and allows the frequency of calling memory means 15 to store the added count value again. The display mode selection means 16 determines the display mode setup of the telephone numbers and the like according to setup conditions inputted from the keyboard 5 by the user. The display sequence determination means 17 determines the display sequence of the telephone numbers and the like based on setup conditions inputted by the user and the data in the frequency of calling memory portion 15, and allows the display sequence memory portion 7 to store the display sequence. The display control means 18 performs the display of the telephone numbers and the like according to the display sequence stored in the display sequence memory portion 7. The above-described CPU 1 can have control means and the like to control the entire operations of each of the above-described means.

Figure 2:
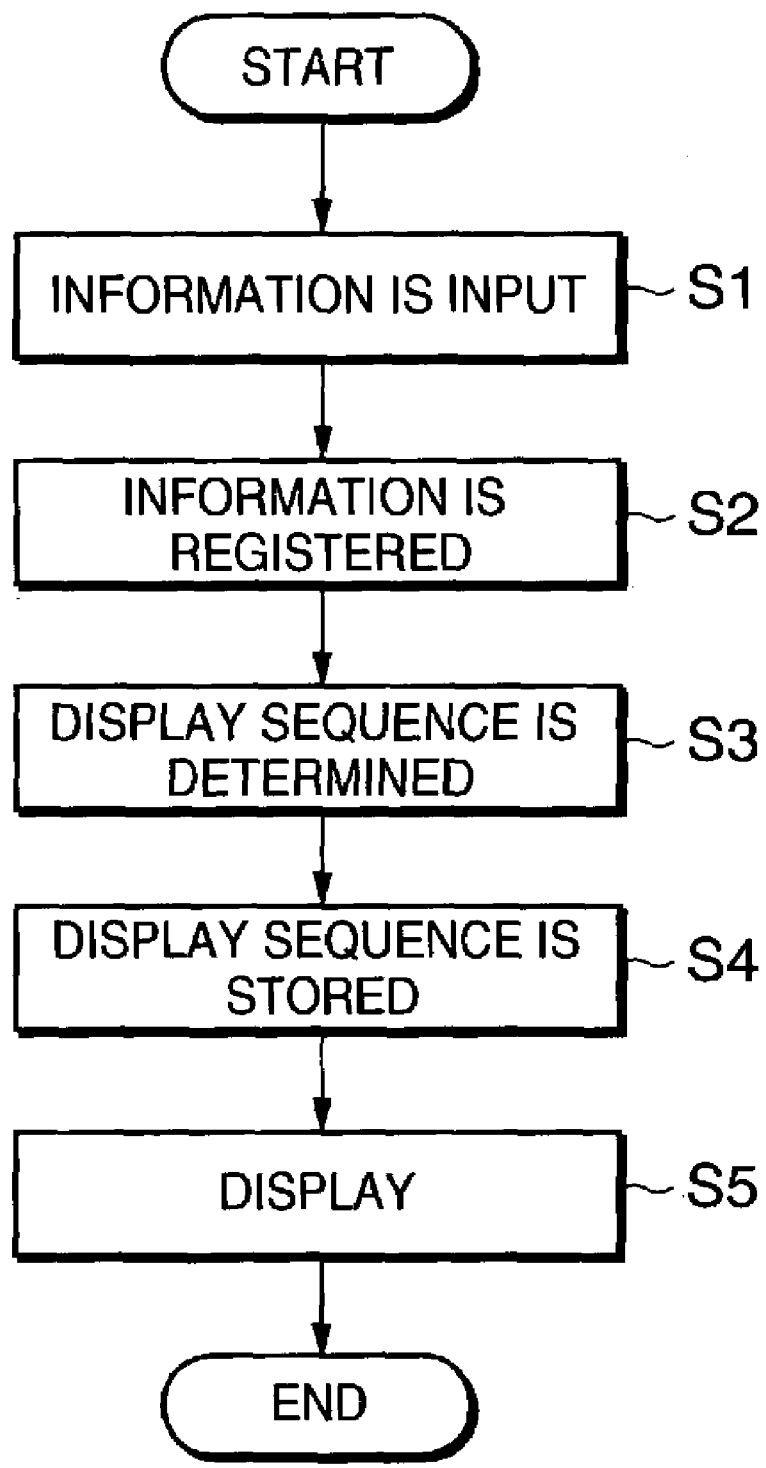
FIG. 2 is a flowchart showing the embodiment of a display of a telephone number.

Referring to FIG. 2, there is illustrated an embodiment of a basic operation of the above-described mobile terminal device. This operation is realized by implementing the program stored in the memory portion 8 by the CPU 1. First, the telephone numbers and the like are inputted to the mobile terminal device (S1). The user can input these telephone numbers and the like from the keyboard 5. These pieces of information can be automatically inputted when the user calls and receiving calls. The information registration control means 11 registers the inputted information in a predetermined memory portion (S2). After that, every time the user calls, the frequency of callings for every telephone number is updated and stored in the frequency of calling memory portion 15. The display sequence determination means 17 updates and determines the display sequence of the registered information according to the sequence of the frequency of calling in the memory portion 15 when it comes a time which is set in advance in the mobile terminal device or a time which is set by the user (S3), and allows the display sequence to be held in the display sequence memory portion 7 (S4). When the user selects the display of telephone numbers and the like, the display control means 18 display the telephone numbers and the like in the display portion 6 according to the display stored in the display sequence memory portion 7 (S5). The updated of the above-described display sequence can be sequentially performed in conjunction with the update of the frequency of calling. When the display sequence updated at the above-described time is stored in the display sequence memory portion 7, the data in the frequency of calling memory portion 15 can be reset. It is possible to further add the frequency of calling after the update of the display sequence to the frequency of calling stored in the frequency of calling memory portion 15.

Figure 3:
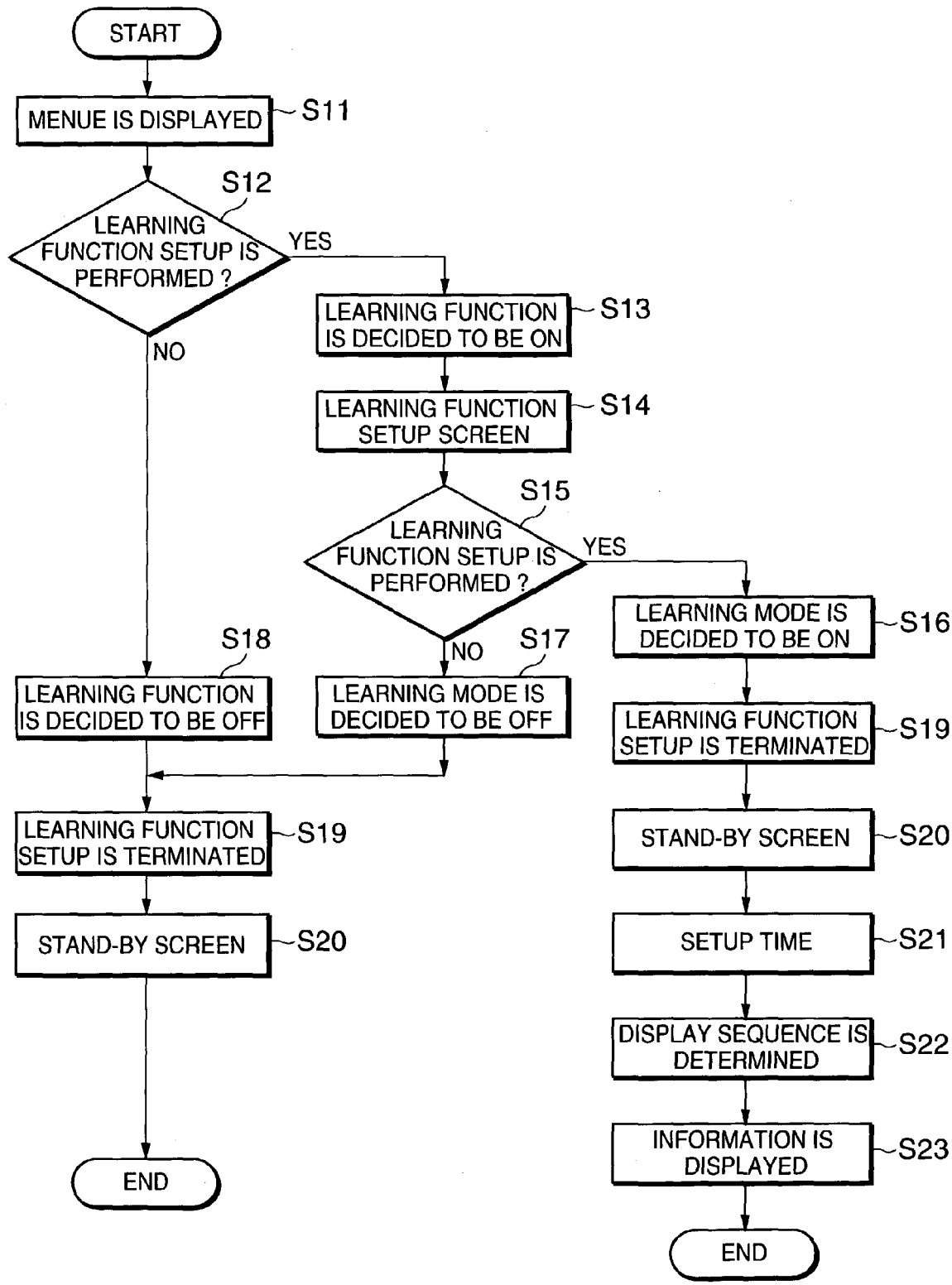
FIG. 3 is a flowchart showing the embodiment of a learning function setup of the mobile terminal device.

Referring to FIG. 3, there is illustrated an embodiment of a process of setting up a learning function for the above-described mobile terminal device. This process is realized by the CPU 1 executing the program in the memory portion 8. When the user allows a menu screen to be displayed in the display portion 6 (S11) and selects a learning function setup from the menu (YES of S12), the learning function is decided to be ON (S13). In the case where the user does not select the learning function setup (NO of S12), the learning function is decided to be OFF (S18), and the learning function setup is terminated (S19), and a normal stand-by screen appears (S20). When the learning function is decided to be ON, the display portion 6 displays a learning function setup screen shown in FIG. 4 (S14). When the user selects NO at the screen (S15), a learning mode is decided to be OFF (S17). When the user selects YES at the learning function setup screen (S15), the learning mode is decided to be ON (S16), and the learning function setup is terminated (S19), and the normal stand-by screen appears (S20). When it comes a time, which is set in advance in the mobile terminal device (S21), the display sequence of the telephone numbers and the like is updated and decided (S22). When the user allows the telephone numbers and the like to be displayed in the display portion 6, the telephone numbers and the like are displayed in this updated display sequence.

Figure 5:
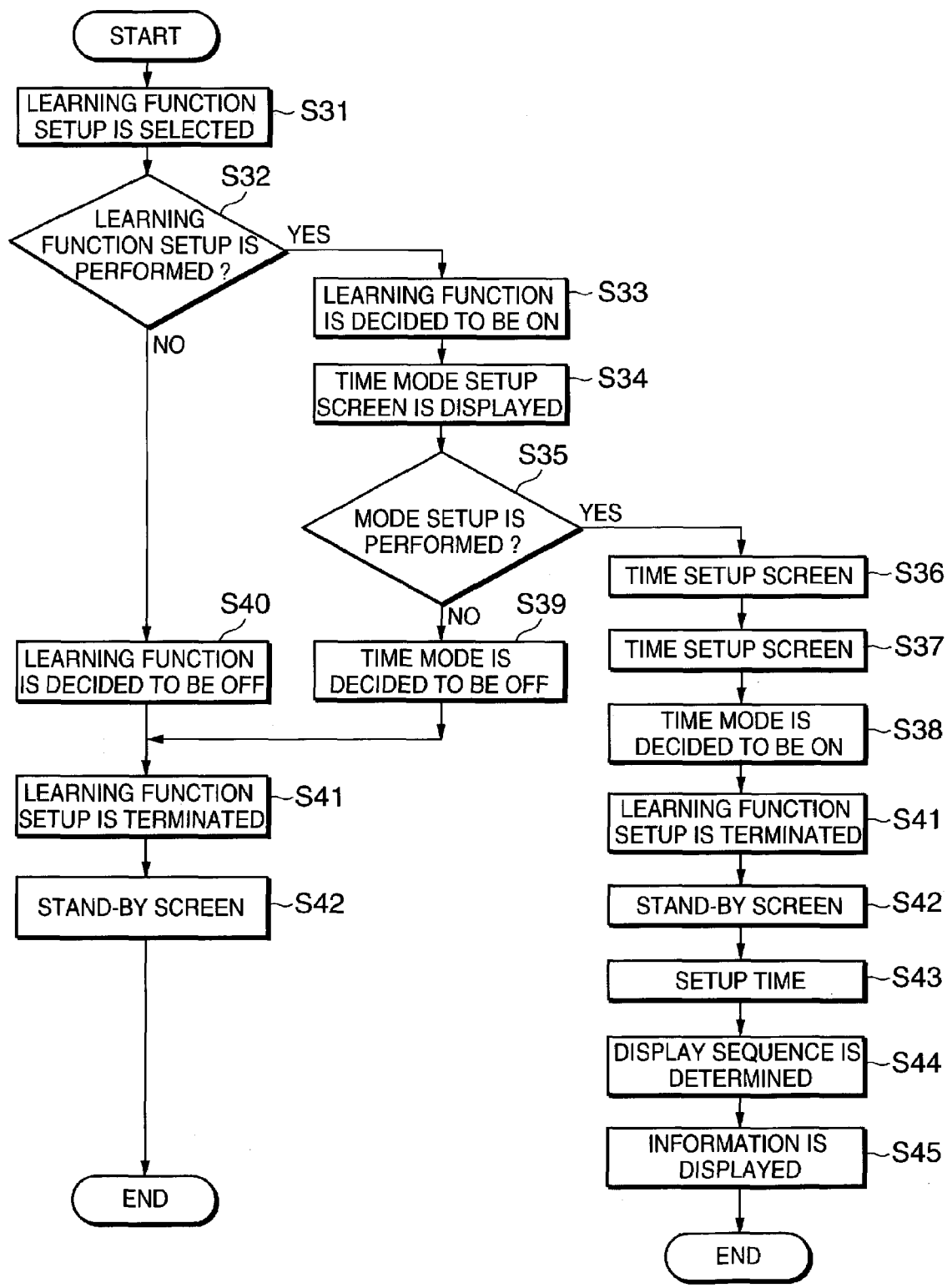
FIG. 5 is a flowchart showing the embodiment of the learning function setup of the mobile terminal device.

Referring to FIG. 5, there is illustrated an embodiment of a process of setting up another learning function for the above-described mobile terminal device. This process is realized by the CPU 1 executing the program in the memory portion 8. The processes up to S31, S32, S33 of FIG. 5 are the same as the processes of FIG. 3. FIG. 6A shows a setup screen of a time mode of S34 of FIG. 5. When the user selects NO at the time mode setup screen of FIG. 6A (S35), the time mode is decided to be OFF (S39). When the user selects YES at the time mode setup screen of FIG. 6A (S35), the screen shown in FIG. 6B appears (S36). The user inputs a period (for example, every forty eight hours, every hundred twenty hours) to update the display sequence of the telephone numbers and the like. Then, the time mode is decided to be ON (S38). The processes of S41, S42 are basically the same as S19, S20 of FIG. 3. During the set up period, the counting of the frequency of calling are performed, and the updated frequency of calling is stored. When the set up period elapses (S43), the display sequence of the telephone numbers and the like is updated based on the latest frequency of calling, and a updated display sequence is stored in the display sequence memory portion 7 (S44). At this time, the frequency of calling memory portion 15, which stores the frequency of calling, is reset. When the user allows the telephone numbers and the like to be displayed in the mobile terminal device, the telephone numbers and the like are displayed according to the display sequence stored in the display sequence memory portion 7.

Figure 7:
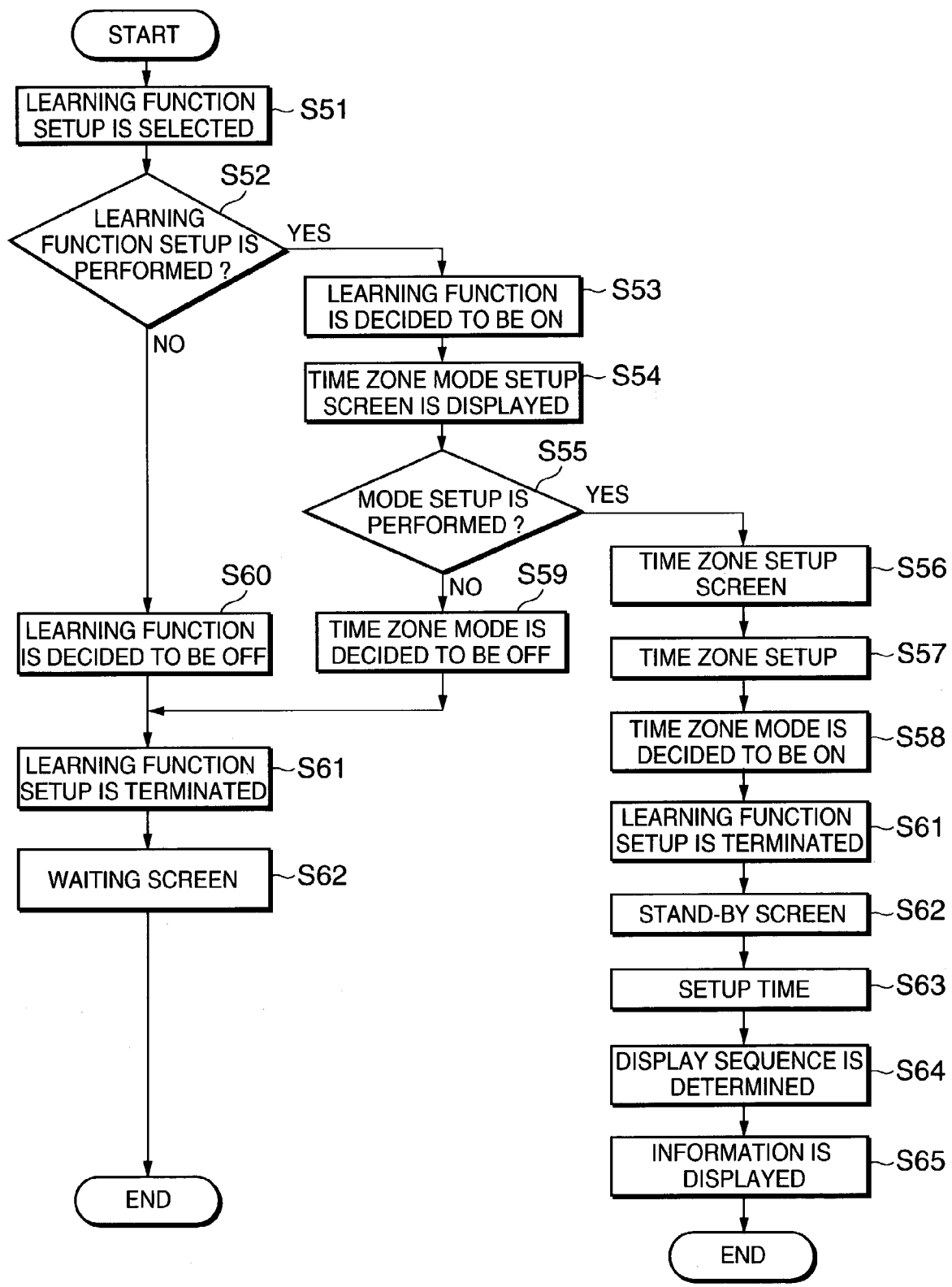
FIG. 7 is a flowchart showing the embodiment of the learning function setup of the mobile terminal device.

Referring to FIG. 7, there is illustrated an embodiment of a process for setting up still another learning function for the above-described mobile terminal device. This process is realized by the CPU 1 implementing the program in the memory portion 8. The processes up to S51, S52, S53 of FIG. 7 are the same as the processes of S11 to S13 of FIG. 3. FIG. 8A shows the time zone mode setup screen of S54. When the user selects NO at this time zone mode setup screen (S55), the time zone is determined to be OFF (S59). When the user selects YES at this time zone mode setup screen (S55), the screen shown in FIG. 8B appears (S56). The user inputs a time zone (starting time and finishing time) (S57). Then, the time zone mode is decided to be ON. The processes of S61, S62 are basically the same as those of S19, S20 of FIG. 3. The counting of the frequency of calling is performed from the set up starting time, and the updated frequency of calling is stored (S63). When it comes the set up finishing time, the display sequence of the telephone numbers is updated based on the latest frequency of calling, and is stored in the display sequence memory portion 7 (S64). In this case, when it comes the starting time again, the counting of the frequency of calling is started, and a still new frequency of calling is added to the frequency of calling stored in the frequency of calling memory portion 15 and stored. When the user allows the telephone numbers and the like to be displayed in the mobile terminal device, the telephone numbers and the like are displayed according to the display sequence held in the display sequence memory portion 7.

The learning functions shown in FIG. 3, FIG. 5 and FIG. 7 can be mutually selected. For example, when a learning function is set up in a menu screen, it is possible to display a screen capable of selecting the above three learning functions.

In the mobile terminal device of the present invention, since the telephone numbers and the like are displayed in higher order of the frequency in use (the frequency of calling), the user can have prompt access to a desired telephone number when making a telephone call.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A mobile terminal device capable of storing and displaying telephone numbers, said mobile terminal device comprising:
    count means for counting a frequency of called telephone numbers;
    a first memory portion for storing an updated frequency of the called telephone numbers;
    a display sequence determination means for updating a display sequence of the called telephone numbers according to the updated frequency;
    display mode selection means for determining a display mode of the display sequence of the called telephone numbers, wherein the display mode includes a first mode wherein said display sequence determination means updates the display sequence at a given time, a second mode wherein said display sequence determination means updates the display sequence every given time period, and a third mode wherein said display sequence determination means updates the display sequence based on given start and stop times; and
    a second memory portion for storing the display sequence of the called telephone numbers.

2. The mobile terminal device according to claim 1, wherein the display sequence determination means updates the display sequence of the telephone numbers for every calling to the telephone numbers and stores it in the second memory portion.

3. The mobile terminal device according to claim 1, wherein, when the display sequence of the telephone numbers is updated, the first memory portion is reset.

4. The mobile terminal device according to claim 1, comprising display control means for displaying the telephone numbers according to the display sequence stored in the second memory portion.

5. A method of controlling a telephone number display in a mobile terminal device, comprising the following steps of:
    storing called telephone numbers in the mobile terminal device;
    determining and storing a frequency of calls to the called telephone numbers; and
    updating a display sequence of the called telephone numbers according to the frequency and storing the display sequence; and
    determining a display mode of the display sequence of the called telephone numbers, wherein the display mode includes a first mode wherein the display sequence is updated at a given time, a second mode wherein the display sequence is updated every given time period, and a third mode wherein the display sequence is updated based on given start and stop times; and
    displaying the telephone numbers according to the display sequence.

6. A program for giving an instruction to a computer and controlling a telephone number display in a mobile terminal device, said program comprising the steps of:
    determining and storing a frequency of calls to called telephone numbers;
    storing the frequency;
    updating a display sequence of the called telephone numbers according to the frequency and storing the display
    sequence; and
    determining a display mode of the display sequence of the called telephone numbers, wherein the display mode includes a first mode wherein the display sequence is updated at a given time, a second mode wherein the display sequence is updated every given time period, and a third mode wherein the display sequence is updated based on given start and stop times; and
    displaying the telephone numbers according to the display sequence.

* * * * *